United States Patent
Yu et al.

(10) Patent No.: US 6,697,741 B2
(45) Date of Patent: Feb. 24, 2004

(54) METHOD AND SYSTEM FOR EVALUATING AND MONITORING HYDRAULIC PUMP NOISE LEVELS

(75) Inventors: Jinghong Yu, Marysville, OH (US); Keiichi Shimizu, Columbus, OH (US); David A. Thompson, Rushsylvania, OH (US); Andrew Paul Ritchie, Marysville, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/062,352

(22) Filed: Jan. 31, 2002

(65) Prior Publication Data

US 2003/0144811 A1 Jul. 31, 2003

(51) Int. Cl.[7] .............................. G01B 3/00; G01B 5/00
(52) U.S. Cl. ....................................................... 702/33
(58) Field of Search ................................. 702/140, 127, 702/33, 45, 47, 55, 50, 100, 105, 113, 114; 73/19.05, 152.04, 168, 19.1, 37; 417/1, 323; 60/327

(56) References Cited

U.S. PATENT DOCUMENTS

| | | | | | |
|---|---|---|---|---|---|
| 5,426,971 A | * | 6/1995 | Glidewell et al. | ......... | 73/19.05 |
| 5,492,451 A | * | 2/1996 | Franz et al. | ................ | 417/312 |
| 5,560,205 A | * | 10/1996 | Huebner | ....................... | 60/469 |
| 5,624,409 A | * | 4/1997 | Seale | .......................... | 604/246 |
| 5,769,608 A | * | 6/1998 | Seale | .......................... | 415/53 |
| 5,791,141 A | * | 8/1998 | Phillips | ........................ | 60/327 |
| 6,155,378 A | * | 12/2000 | Qatu et al. | .................. | 181/255 |
| 6,234,758 B1 | * | 5/2001 | Pawelski | ..................... | 417/26 |
| 6,309,187 B1 | * | 10/2001 | Robertson et al. | .......... | 417/312 |

* cited by examiner

Primary Examiner—John Barlow
Assistant Examiner—Demetrius Pretlow
(74) Attorney, Agent, or Firm—Rankin, Hill, Porter & Clark LLP; Mark E. Duell

(57) ABSTRACT

A method and system for determining fluidborne noise characteristics of a fluid power pump. The system includes the pump, a reference pipe fluidly connected to a discharge of the pump, three pressure sensors disposed within the reference pipe at predetermined spacings from each other and the pump, first and second loading valves, and a calculating and analysis assembly. The loading valves are selectively and alternatingly actuated to pressurize fluid contained in the system. The calculating and analysis assembly receives signals from the pressure sensors and signals indicative of the rotational speed of the pump. The calculating and analysis assembly uses these signals, together with the known physical characteristics of the reference pipe and the system fluid, to determine the source flow ripple and internal impedance. Thereafter, the calculating and analysis assembly thereafter determines the level of the source flow ripple level, which corresponds to source fluidborne noise characteristics of the pump, based upon the calculated source flow ripple.

7 Claims, 3 Drawing Sheets

FIG. 2
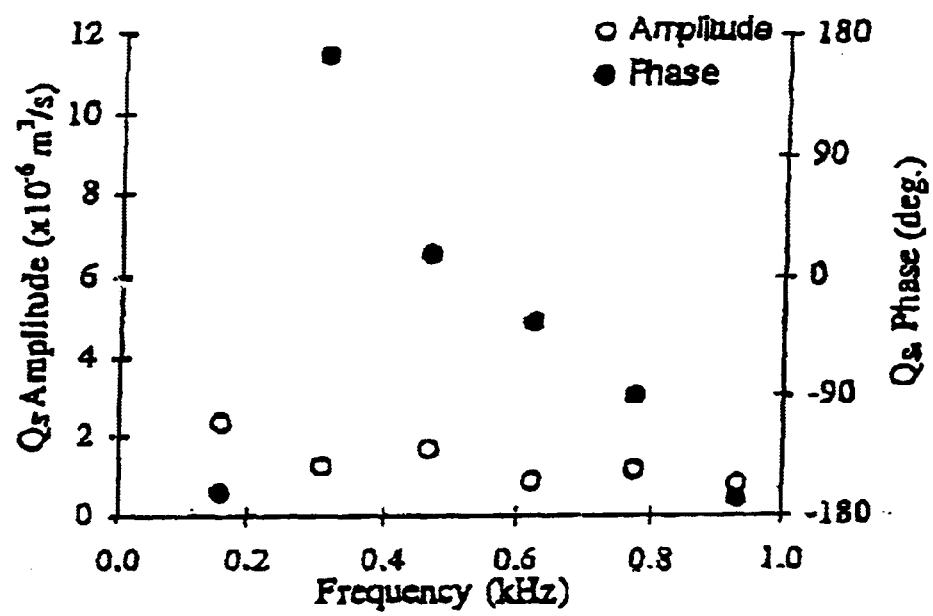
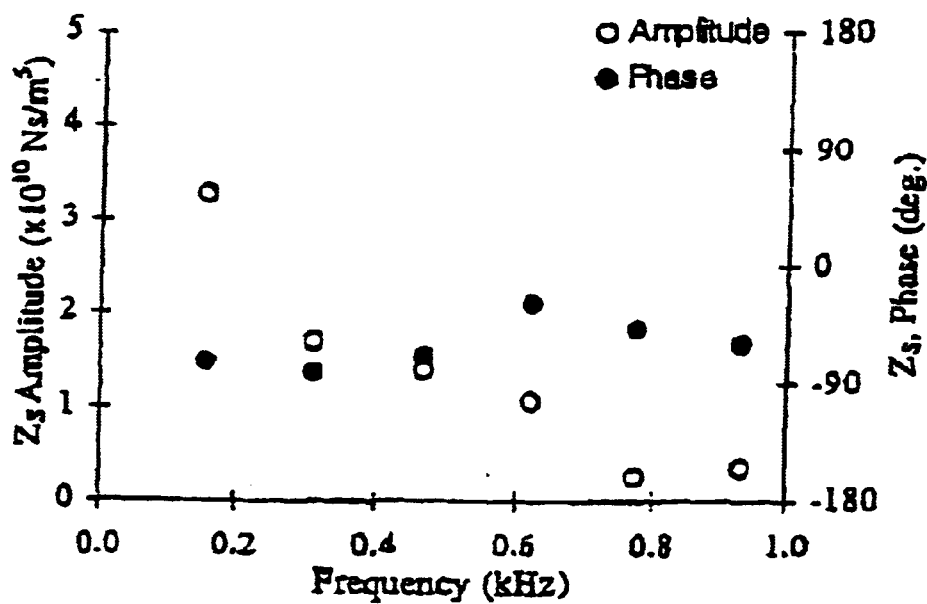
FIG. 3

FIG. 4
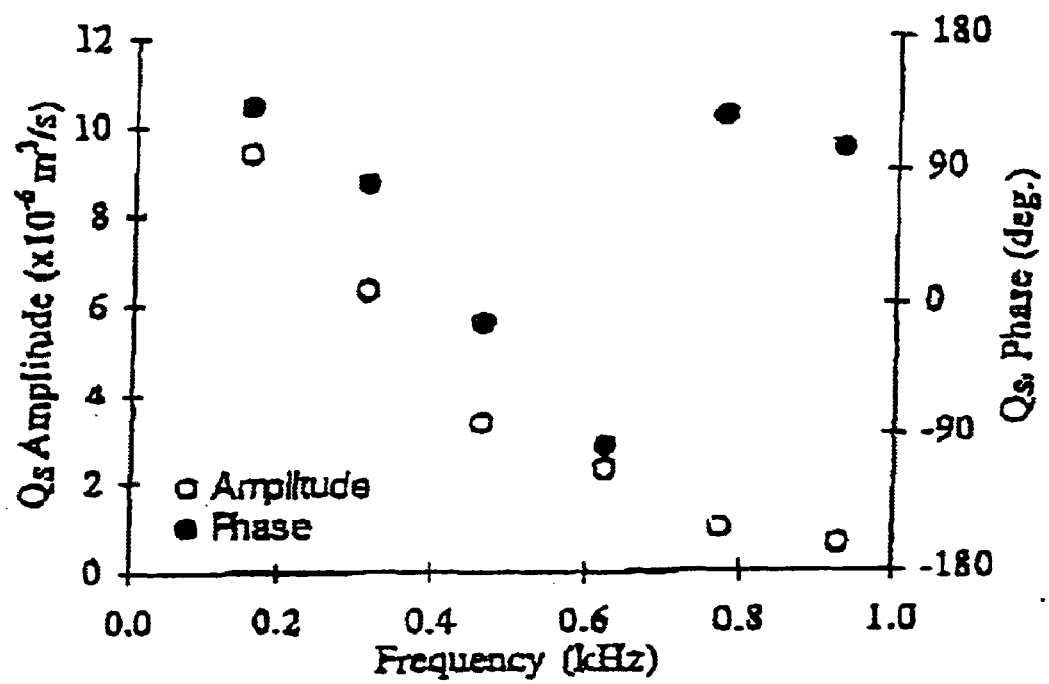
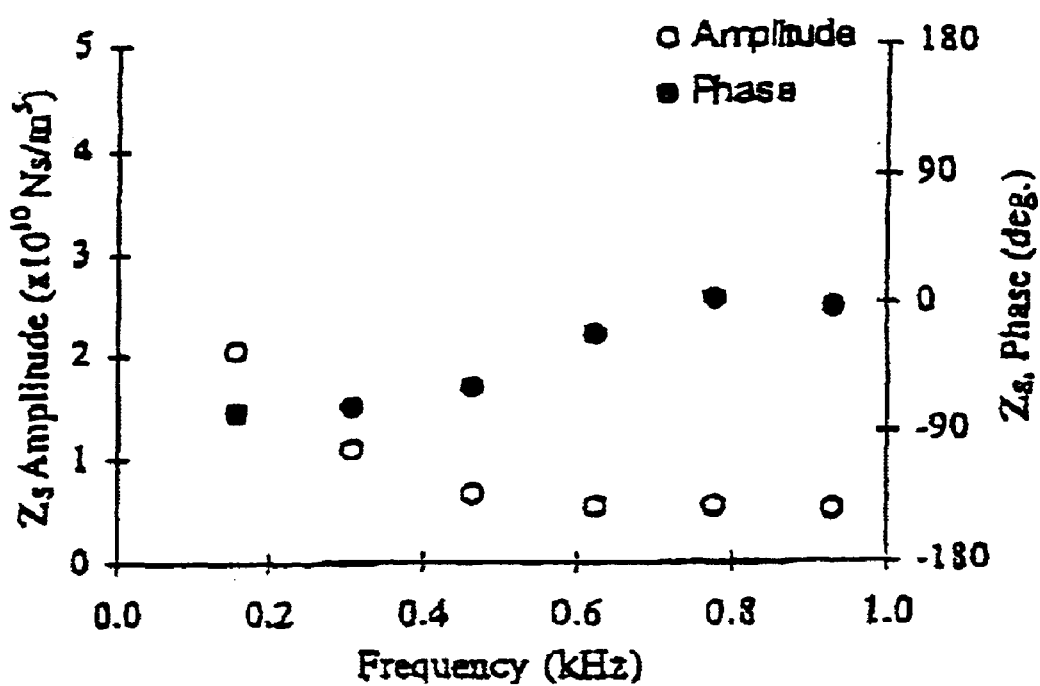
FIG. 5

METHOD AND SYSTEM FOR EVALUATING AND MONITORING HYDRAULIC PUMP NOISE LEVELS

BACKGROUND OF THE INVENTION

1. Field of the Invention

The present invention generally relates to pump monitoring systems and, more specifically, to methods and systems for monitoring and evaluating fluidborne noise levels in a fluid circuit.

2. Description of Related Art

Steering noise is one of the deep-rooted concerns affecting vehicle marketability. Fluidborne noise is one major type of noise that can be heard in a hydraulic power steering system. In the system, the power steering pump is the fluidborne noise source that delivers fluctuating flows i.e., flow ripples, to the system. The flow ripple and the source impedance of the pump then interact with the connected hose, tubing, and steering gearbox to generate pressure pulsations.

The pressure pulsations are transmitted through the fluid to everywhere in the system and may excite dangerous mechanical vibrations and high levels of airborne noise. Currently, the conventional method to judge the source fluidborne noise characteristics of power steering pumps is to measure actual pressure pulsation levels at one location in a given pump-hose-valve bench system, which is known in the art as the "one pressure" method.

However, there are several technical problems with the current method. First, the results obtained from the current method are significantly dependent on the entire measurement system. That is, slight changes to the dimensions of connection pipes and/or the characteristics of the loading valve will result in totally different results. This makes it difficult or impossible to compare test results obtained in different geographical places. Second, the results obtained may not reflect actual noise levels or trends when the pump is installed in an actual power steering system because the impedance characteristics of the bench loading valve are different from those of the power steering gearbox. Finally, the results are the combined effect of the entire measurement system and they cannot be used as objective scaling for the inherent fluidborne noise properties of the pump.

SUMMARY OF THE INVENTION

The present invention is directed toward a method and system for determining the source fluidborne noise characteristics of a power steering pump. In accordance with the system of the present invention, the pump discharge is connected to a reference pipe that has three pressure sensors disposed therein at predetermined spacings from one another and from the pump discharge. First and second loading valves are disposed downstream the reference pipe and are fluidly connected by an extension pipe. Pump rotational speed is monitored by a photoelectric detector.

In further accordance with the present invention, the system includes a calculating and analysis assembly including an amplifying and filtering device, a fast Fourier transform (FFT) analyzer, and a computer. The calculating and analysis assembly uses pressure signals from the pressure sensors, together with known fluid dynamic properties of the reference pipe, the unknown properties of the fluid, and the known spacing between the sensors to calculate the source flow ripple and the internal impedance of the pump. The source flow ripple and internal impedance are subsequently used to determine the source flow ripple level, which is indicative of the noise characteristics of the pump.

BRIEF DESCRIPTION OF THE DRAWINGS

These and further features of the invention will be apparent with reference to the following description and drawings, wherein:

FIG. 2 is a graph illustrating a measured source flow ripple of a first pump;

FIG. 3 is a graph illustrating an internal impedance of the first pump;

FIG. 4 is a graph illustrating the measured source flow ripple of a second pump; and, FIG. 5 is a graph illustrating the internal impedance of the second pump.

DETAILED DESCRIPTION OF THE PREFERRED EMBODIMENTS

Figure 1:
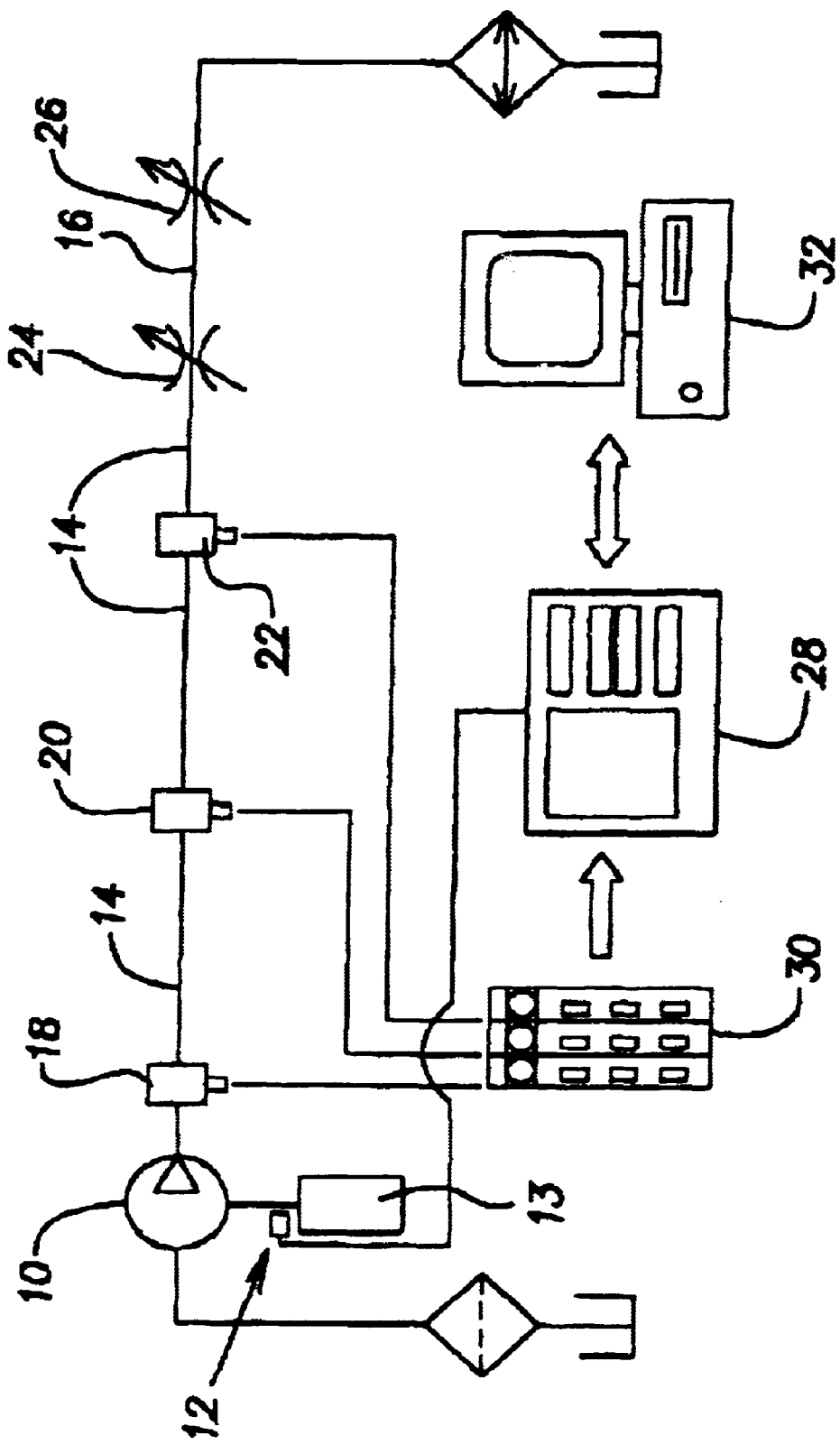
FIG. 1 schematically illustrates a system according to the present invention.

The source fluidborne noise characteristics of a power steering pump is the potential of the pump to excite flow and pressure pulsations. The fluidborne noise characteristics may be defined by two parameters: source flow ripple ($Q_s$) and internal impedance ($Z_s$). For a given pump design, the configuration and dimensions of the pump discharge passageway are constant and can be determined for each pump. Accordingly, source flow ripple ($Q_s$) is the key parameter in reflecting the fluidborne noise quality of the pump.

With reference to FIG. 1, the system of the present invention is shown to include a pump 10, a photoelectric detector 12, a rigid, uniform reference pipe 14, an extension pipe 16, a series of pressure sensors 18, 20, 22 received in the reference pipe 14, and first and second loading valves 24, 26 that are interconnected by the extension pipe 16. The series of sensors consists of more than two pressure sensors and, preferably, three pressure sensors. The pump 10 is turned by a motor 13, and the photoelectric detector 12 detects the rotational speed (rpm) of the motor shaft and, hence, the pump 10, and generates a pulse signal used to trigger a Fast Fourier Transform (FFT) analyzer 28 that is used to perform average calculations and spectrum analysis.

The pressure sensors 18, 20, 22 transmit pressure signals to an amplifying and filtering device 30, which powers the pressure sensors 18, 20, 22, provides selectable gain or amplification settings, and low pass filtering. The amplifying and filtering device 30 transmits amplified and filtered pressure signals to the FFT analyzer 28. The FFT analyzer 28 receives pressure signals from the amplifying and filtering device 30, as well as pulse signals from the photoelectric detector 12, and performs time domain averaging calculations and fast Fourier transforms, and transmits amplitude harmonic and phase harmonic spectrums to a personal computer 32.

The computer 32 receives data from the FFT analyzer 28 and performs calculations, described hereinafter, provides display and reporting functions, and sets up the FFT analyzer 28 operating parameters. Accordingly, the amplifying and filter device 30, FFT analyzer 28, and computer 32 serve as a calculating and analysis assembly. Naturally, it is considered apparent that the components of the calculating and analysis assembly may be replaced by other components without departing from the scope and spirit of the present invention so long as the functionality of the present invention is maintained.

More specifically, the inventive system monitors pressure pulsations along the reference pipe 14, which is directly connected to the pump discharge. The pressure pulsations are measured at three properly separated locations by means of the three pressure sensors 18, 20, 22. The first loading valve 24 is disposed at the end of the reference pipe 14, while the second loading valve 26 is separated from the first loading valve 24 by the extension pipe 16, which is substantially identical to the reference pipe 14 and of a predetermined length.

The system is alternatively loaded or pressurized using the two loading valves 24, 26. The pressure pulsation signals, together with the known fluid dynamic properties of the reference pipe 14, and the extension pipe 16, the known spacing between the sensors/valves, and the known properties of the fluid, provide enough information to yield the source flow ripple and the internal impedance of the pump by the inventive method described hereinafter.

The inventive method may be thought of as a three-pressures/two systems method of determining flow ripple and internal impedance and provides significant advantages over the prior art one pressure method. Based upon the harmonic spectrum of the determined source flow ripple, the average power in the frequency domain ($L_{qf}$) is calculated. The average power in the frequency domain is used to judge or determine the level of the source flow ripple generated by the subject pump 10.

Properties of the fluid used in the pump system are important in evaluating the pump noise. These properties include the density ($\rho$) and viscosity ($\upsilon$) of the fluid, which are known from manufacturing data. The sound speed (c) in the fluid is derived from pressure signals from the pressure sensors 18, 20, 22.

Further, properties of the reference pipe 14 and extension pipe 16 used in the system are also important. These properties include the characteristic impedance ($Z_c$) of the pipe, and the wave propagation coefficient ($\beta$), which are derived from the following equations:

$$Z_c = \frac{\rho c \xi(\omega)}{\pi r^2} \qquad (1)$$

$$\beta = \frac{\omega \xi(\omega)}{c} \qquad (2)$$

where $$\xi(\omega) = 1 + \sqrt{\frac{\upsilon}{2r^2\omega}} - j\left[\sqrt{\frac{\upsilon}{2r^2\omega}} + \frac{\upsilon}{r^2\omega}\right],$$

$j=\sqrt{-1}$, and $\omega$=angular frequency

Hereafter, the steps in taking measurements that will be subsequently be used to determine the source flow ripple, internal impedance, and average power in the frequency domain will be discussed.

First, the power steering fluid is preheated to a predetermined temperature, for example 70° C. Then, the pump 10 is turned on, an average pressure in the system is established using the first loading valve 24 (referred to hereinafter as System 1), and the correct pump rotational speed is established. Signals from the pressure sensors 18, 20, 22 are received and the pump harmonic spectra are derived for the received pressure signals.

Thereafter, the first loading valve 24 is opened to unload the system, and the second valve 26 is closed to set up the average pressure in the system (referred to hereinafter as System 2). The signals from the pressure sensors 18, 20, 22 are received and the pump harmonic spectra are derived for the received pressure signals. Finally, calculations are performed to complete the test procedure. First, the source flow ripple and internal impedance are calculated in both the frequency domain and the time domain using the received data. Thereafter, the flow ripple level is obtained.

More specifically, assuming that $P_1$, $P_2$, and $P_3$ are the pressure pulsation signals taken from the first, second, and third pressure sensors 18, 20, 22, respectively, for System 1 (i.e., system loaded by the first loading valve 24), $P_1'$, $P_2'$, and $P_3'$ are the pressure pulsation signals taken from the first, second, and third pressure sensors 18, 20, 22, respectively, for System 2 (i.e., system loaded by the second loading valve 26), Lo is the distance between the pump exit and the first pressure sensor 18, L is the distance between the first pressure sensor 18 and the second pressure sensor 20, and $L_1$ is the distance between the second pressure sensor 20 and the third pressure sensor 22. Then, the sound speed in the fluid is derived from the equation:

$$\frac{P_1}{P_2}\sin\left[\frac{\xi(\omega)\omega}{c}L_1\right] + \frac{P_3}{P_2}\sin\left[\frac{\xi(\omega)\omega}{c}L\right] - \sin\left[\frac{\xi(\omega)\omega}{c}(L+L_1)\right] = 0 \qquad (3)$$

and the source flow ripple and internal impedance, respectively, are derived from:

$$Q_s = \frac{j}{Z_c}P_1P_2' - \frac{P_1'P_2}{(P_1-P_1')\sin[\beta(L+L_0)] - (P_2-P_2')\sin(\beta L_0)} \qquad (4)$$

$$Z_s = -jZ_c(P_1-P_1')\sin[\beta(L+L_0)] - \qquad (5)$$
$$\frac{(P_2-P_2')\sin(\beta L_0)}{(P_1-P_1')\cos[\beta(L+L_0)] - (P_2-P_2')\cos(\beta L_0)}$$

Therefore, assuming that $Q_i$ is the i-th order harmonic amplitude of $Q_s$, then the flow ripple level indicator, when taking into consideration of up to the k-th harmonic orders, is given by the following equation:

$$L_{qlk} = 20\log_{10}\sqrt{\frac{1}{k}\sum_{i=1}^{k}Q_i^2/Q_{ref}^2} \qquad (6)$$

wherein $Q_{ref}=10^{-6}$m$^3$/s.

With reference to FIGS. 2–5, the measured source flow ripple and measured internal impedance of two different pumps are illustrated. In these tests, the first pressure sensor 18 is about 0.28 m from the pump discharge, the pressure sensors 18, 20, 22 are spaced about 0.28 m from each other, the first loading valve 24 is about 0.28 m from the third pressure sensor 22, and the second loading valve 26 is about 0.28 m from the first loading valve 24. The reference and extension pipes 14, 16 are seamless, stainless steel with an outside diameter of 0.375 inches and a wall thickness of 0.049 inches. The first pump's measured source flow ripple and internal impedance are respectively illustrated in FIGS. 2–3. The first pump has a measured flow ripple level ($L_{qf}$) of 1.47 dB. The second pump's measured source flow ripple and internal impedance are respectively illustrated in FIGS. 4–5. The second pump has a measured flow ripple level ($L_{qf}$) of 4.90 dB.

The system and method according to the present invention offers several advantages over the prior art. First, the results obtained from the inventive method and system are independent of the test system, while the prior art system is significantly dependent upon the test system. Second, the inventive method yields the source noise properties of the pump itself, while the prior art method can only provide pressure pulsation results in the test system. Third, the results of the invention are the true properties of the pump, while the results with the prior art method are neither true results of the pump nor true results of the power steering system. Moreover, with the present invention the objective and common scaling of pump noise properties can be easily established. Also, the specifications of pump fluidborne noise properties can be developed easily and logically using the present invention.

What is claimed is:

1. A method for determining fluidborne noise characteristics of a fluid power pump, said pump being incorporated into a testing system comprising means for determining a rotational speed of the pump, a reference pipe fluidly connected to a discharge of said pump, more than two pressure sensors disposed within the reference pipe at predetermined spacings from each other and the pump discharge, said system further comprising first and second loading valves and a calculating and analysis assembly, said loading valves being selectively and alternatingly actuated to pressurize fluid contained in the system, said calculating and analysis assembly receives signals from said pressure sensors and said speed determining means, comprising the steps of:
   a) activating the pump to force fluid through the reference pipe and the extension pipe;
   b) closing the first loading valve to establish a predetermined average pressure in the system;
   c) measuring the pressure using said pressure sensors and transmitting first pressure signals to said calculating and analysis assembly;
   d) calculating harmonic spectra for said first pressure signals;
   e) opening the first loading valve and closing the second loading valve to establish the predetermined average pressure in the system;
   f) measuring the pressure using said pressure sensors and transmitting second pressure signals to said calculating and analysis assembly;
   g) calculating harmonic spectra for said second pressure signals;
   h) calculating source flow ripple and internal impedance using sensed pressure together with known physical properties of the reference pipe and the fluid; and,
   i) calculating flow ripple level using said source flow ripple and internal impedance, said calculated flow ripple level corresponding to source fluidborne noise of the pump.

2. The method according to claim 1, wherein said source flow ripple is determined by the equation:

$$Q_s = \frac{j}{Z_c} \frac{P_1 P_2' - P_1' P_2}{(P_1 - P_1')\sin[\beta(L+L_0)] - (P_2 - P_2')\sin(\beta L_0)}$$

wherein $Z_c$ is a characteristic impedance of the reference pipe, $\beta$ is a wave propagation coefficient, $P_1$, $P_2$, and $P_3$ are the pressure pulsation signals measured with first, second, and third pressure sensors in step c), respectively, $P_1'$, $P_2'$, and $P_3'$ are the pressure pulsation signals taken from the first, second, and third pressure sensors in step f), respectively, $L_0$ is a distance between the pump exit and the first pressure sensor, $L$ is a distance between the first pressure sensor and the second pressure sensor, and $L_1$ is a distance between the second pressure sensor and the third pressure sensor.

3. The method according to claim 2, wherein:

$$Z_c = \frac{\rho c \xi(\omega)}{\pi r^2}$$

$$\beta = \frac{\omega \xi(\omega)}{c}$$

where $$\xi(\omega) = 1 + \sqrt{\frac{\upsilon}{2r^2\omega}} - j\left[\sqrt{\frac{\upsilon}{2r^2\omega}} + \frac{\upsilon}{r^2\omega}\right],$$

$j=\sqrt{-1}$, $\omega$=angular frequency, $\rho$ is a density of the fluid, $\upsilon$ is a viscosity of the fluid, and $c$ is a sound speed in the fluid.

4. The method according to claim 3, wherein:

$$Z_s = -jZ_c \frac{(P_1 - P_1')\sin[\beta(L+L_0)] - (P_2 - P_2')\sin(\beta L_0)}{(P_1 - P_1')\cos[\beta(L+L_0)] - (P_2 - P_2')\cos(\beta L_0)}$$

5. The method according to claim 4, wherein, assuming that $Q_i$ is the i-th order harmonic amplitude of $Q_s$, then the flow ripple level indicator, when taking into consideration of up to the k-th harmonic orders, is:

$$L_{qfk} = 20\log_{10}\sqrt{\frac{1}{k}\sum_{i=1}^{k} Q_i^2 / Q_{ref}^2}$$

wherein $Q_{ref}=10^{-6}\text{m}^3/\text{s}$.

6. A system for determining fluidborne noise characteristics of a fluid power pump, said system comprising
   a.) the pump,
   b.) means for determining a rotational speed of the pump,
   c.) a reference pipe fluidly connected to a discharge of said pump,
   d.) more than two pressure sensors disposed within said reference pipe at predetermined spacings from each other and the pump,
   e.) first and second loading valves that are selectively and alternatingly actuated to pressurize fluid contained in the system,
   f.) a calculating and analysis assembly that receives signals from said pressure sensors and said rotational speed determination means and determines a source flow ripple and internal impedance based upon the sensed pressure and the physical characteristics of the reference pipe and fluid used in the system, said calculating and analysis assembly further being operable to determine a level of the source flow ripple, which corresponds to source fluidborne noise characteristics of the pump, based upon the determined source flow ripple.

7. The system for determining fluidborne noise characteristics of a fluid power pump according to claim 6, wherein three pressure sensors are disposed within the reference pipe.

* * * * *